(12) United States Patent
Hawk et al.

(10) Patent No.: US 7,689,750 B2
(45) Date of Patent: Mar. 30, 2010

(54) SYSTEM AND METHOD TO DYNAMICALLY ORDER SYSTEM MANAGEMENT INTERRUPT HANDLER DISPATCHES

(75) Inventors: John J. Hawk, Austin, TX (US); Alok Pant, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 12/047,909

(22) Filed: Mar. 13, 2008

(65) Prior Publication Data

US 2009/0235005 A1    Sep. 17, 2009

(51) Int. Cl.
G06F 13/24 (2006.01)
G06F 13/00 (2006.01)
(52) U.S. Cl. .................................. 710/268; 710/260
(58) Field of Classification Search .......... 710/260–269
See application file for complete search history.

(56) References Cited

U.S. PATENT DOCUMENTS

| | | | |
|---|---|---|---|
| 5,931,936 A * | 8/1999 | Chung et al. ............... 710/263 |
| 6,453,278 B1 | 9/2002 | Favor et al. | |
| 6,880,028 B2 * | 4/2005 | Kurth ......................... 710/240 |
| 7,340,547 B1 * | 3/2008 | Ledebohm .................. 710/260 |
| 7,464,210 B2 * | 12/2008 | Inoue et al. ................. 710/263 |
| 2005/0102447 A1 | 5/2005 | Stultz | |
| 2006/0179199 A1 | 8/2006 | Stern et al. | |
| 2008/0140895 A1 * | 6/2008 | Baker et al. ................. 710/262 |

* cited by examiner

*Primary Examiner*—Clifford H Knoll
*Assistant Examiner*—Trisha Vu
(74) *Attorney, Agent, or Firm*—Haynes and Boone, LLP

(57) ABSTRACT

Handling interrupts within an information handling system including entering into an interrupt management mode in response to receiving an interrupt, identifying at least one source of the received interrupt in accordance with an ordered list of a plurality of possible interrupt sources, dispatching an appropriate interrupt handler to resolve the identified at least one source of the received interrupt, noting a frequency of occurrence of each indentified at least one source generating a received interrupt over time, and recording the ordered list of possible interrupt sources in response to the noted frequency, wherein the possible interrupt sources with higher frequencies are placed in the beginning of the ordered list.

23 Claims, 3 Drawing Sheets

SYSTEM AND METHOD TO DYNAMICALLY ORDER SYSTEM MANAGEMENT INTERRUPT HANDLER DISPATCHES

BACKGROUND

The present disclosure relates generally to information handling systems, and more particularly to dynamically ordering system management interrupt handler dispatches.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

One embodiment, accordingly, provides for handling interrupts within an IHS. An embodiment of a method comprises entering into an interrupt management mode in response to receiving an interrupt, identifying at least one source of the received interrupt in accordance with an ordered list of a plurality of possible interrupt sources, dispatching an appropriate interrupt handler to resolve the identified at least one source of the received interrupt, noting a frequency of occurrence of each identified at least one source generating a received interrupt over time, and reordering the ordered list of possible interrupt sources in response to the noted frequency, wherein the possible interrupt sources with higher frequencies are placed in the beginning of the ordered list.

A principal advantage of this embodiment is that various shortcomings of previous techniques are overcome, and efficiency is increased relative to previous techniques.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
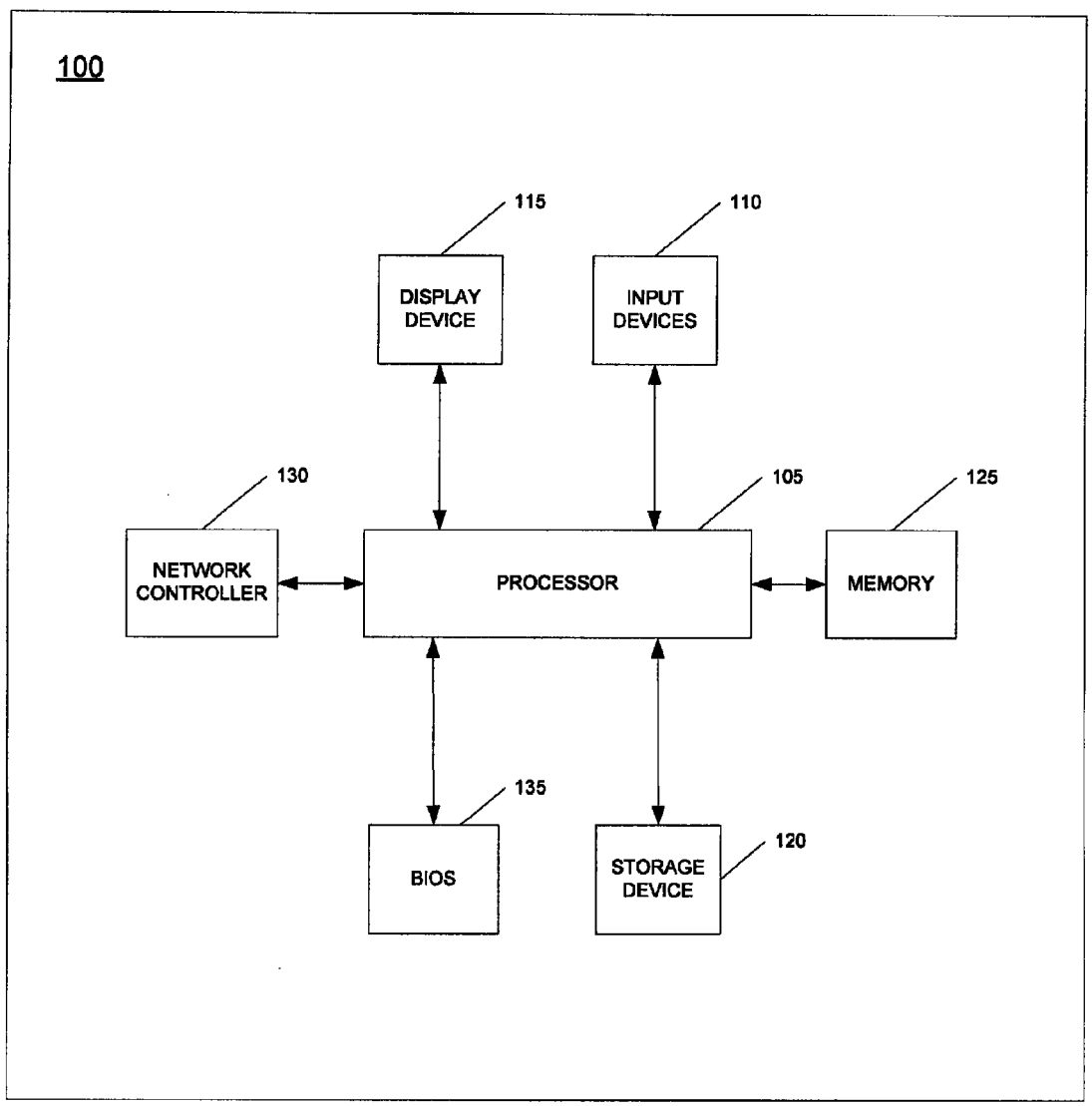
FIG. 1 is a block diagram of an IHS according to an illustrative embodiment.

FIG. 1 is a block diagram of an IHS, indicated generally at 100, according to the illustrative embodiment. The IHS 100 includes a processor 105 (e.g., an Intel processor) for executing and otherwise processing instructions, input devices 110 for receiving information from a user, a display device 115 (e.g., a conventional electronic cathode ray tube (CRT) device) for displaying information to the user, a storage device 120 (e.g., a non-volatile storage device such as a hard disk drive or other computer-readable medium or apparatus) for storing information, a memory device 125 (e.g., random access memory (RAM) device and read only memory (ROM) device), also for storing information, and a network controller 130 for communicating between the IHS 100 and a network. Each of the input devices 110, the display device 115, the storage device 120, the memory device 125, and the network controller 130 is coupled to the processor 105, and to one another. In one example, the IHS 100 includes various other electronic circuitry for performing other operations of the IHS 100, such as a print device (e.g., a ink-jet printer or a laser printer) for printing visual images on paper.

The input devices include, 110 include, for example, a conventional keyboard and a pointing device (e.g., a "mouse", a roller ball, or a light pen). A user operates the keyboard to input alphanumeric text information to the processor 105, and the processor receives such information from the keyboard. A user also operates the pointing device to input cursor-control information to the processor 105, and the processor 105 receives such cursor-control information from the pointing device.

The IHS 100 also includes a basic input/output system (BIOS) 135. The BIOS 135 includes instructions executed by the processor 105, so that the IHS 100 is capable of performing basic operations without executing instructions (e.g., instructions included by an operating system (OS)) stored by the storage device 120. In one example the BIOS 135 is stored by a ROM (e.g., the memory device 125).

Not all IHSs 100 include each of the components shown in FIG. 1, and other components not shown may exist. Furthermore, some components shown as separate may exist in an integrated package or be integrated in a common integrated circuit with other components. As can be appreciated, many systems are expandable, and include or can include a variety of components, including redundant or parallel resources.

While an IHS 100, such as a computer system, is operating, one or more hardware or software components of the IHS may output (e.g., generate) an interrupt (e.g., a system management interrupt (SMI)). Within the exemplary system, the one or more hardware or software components of the IHS 100 that may output an interrupt are associated with, but not limited to, the network controller 130, the input devices 110, the display device 115, the memory device 125, and the storage device 120. Determining the source of a SMI (e.g., a component of the IHS 100 such as one of the input devices 110 or the network controller 130) and the subsequent handling of the SMI disrupts the IHS' conventional operations (e.g., an operation performed by the IHS 100 before the SMI is generated). Such disruption may cause various problems within the IHS 100 including, but not limited to, problems associated with audio and video playbacks.

Upon an occurrence of an SMI the IHS 100 enters into system management mode. When in system management mode, all other processes occurring on processor 105 halt and the BIOS 135 controls the processes occurring on processor 105. Once in system management mode, part of the BIOS's responsibility is to determine the source of the SMI (e.g., a hardware/software component that generated the SMI) in order for the IHS 100 to exit out of system management mode and return to conventional operations (e.g., an operation performed by the IHS 100 before the SMI is generated). Specifically, the SMI dispatcher is responsible for determining the source of a SMI and subsequently dispatching control to the appropriate SMI handler to resolve the issue with the source of the SMI. Thus, it is advantageous to have a process for minimizing the amount of time to identify the source of a SMI in order to optimize the speed of handling the SMI. Thus, an optimized SMI source identification reduces the amount of time the IHS 100 spends in system management mode.

Traditionally when an SMI occurs, the SMI dispatcher is programmed to identify the potential sources of an SMI using a list with a fixed order. In other words, in a traditional IHS 100 when a SMI occurs the SMI dispatcher always checks the potential sources for the cause of an SMI in the same order. Using such a fixed list does not allow the SMI dispatcher the ability to optimize or increase the efficiency of identifying the most likely SMI source.

Figure 2:
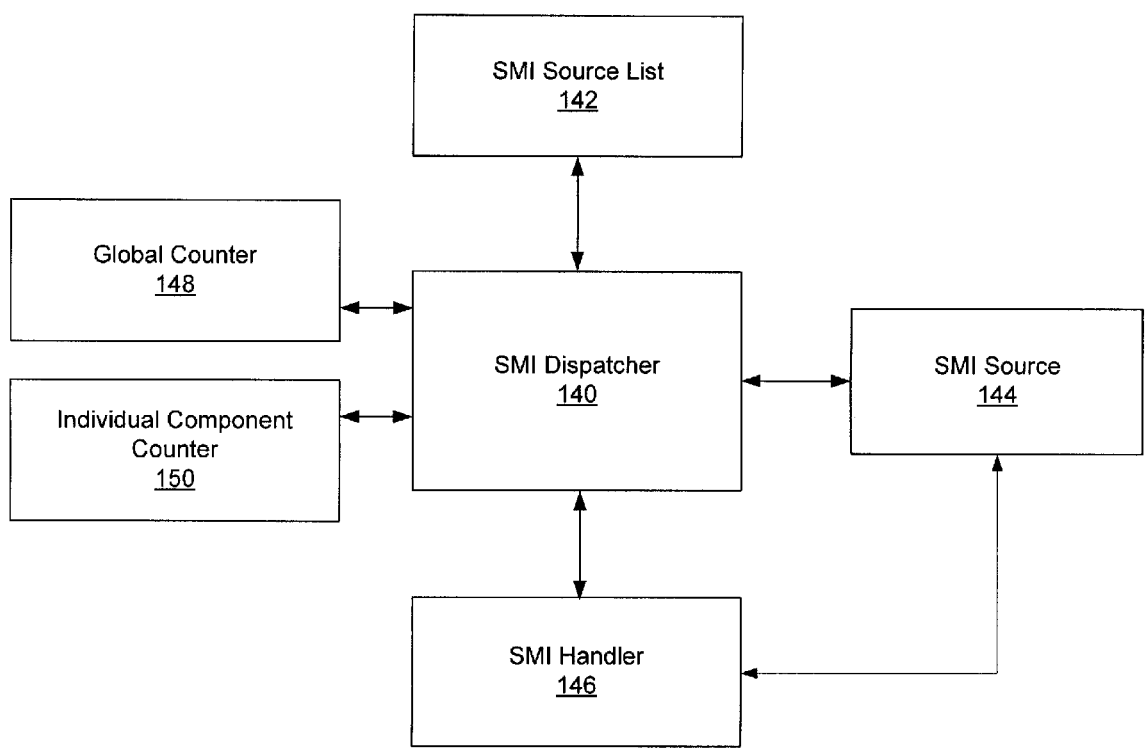
FIG. 2 is a high-level block diagram of an exemplary embodiment of a system to dynamically order system management interrupt handler dispatches.

FIG. 2 is a high-level block diagram of an embodiment of a system to dynamically order system management interrupt handler dispatches. An SMI dispatcher 140 is directed by the BIOS 135 to locate the source of an SMI when the IHS enters system management mode. The order in which the SMI dispatcher 140 checks each potential SMI source 144 is determined by a SMI source list 142. The SMI source list 142 is a dynamic list of entities in the IHS 100 that could generate an SMI, such as software, periodic timer, and over-temperature, for example. The sequence in which the SMI sources can be changed, so that the order in which the SMI dispatcher 140 follows can be dynamically altered. The SMI source 144 that generates an SMI is referred to herein as an active SMI source. Accordingly, the SMI dispatcher 140 checks with each possible SMI source according to the list 142 until it finds the active SMI source.

Another module shown in FIG. 2 is an SMI handler 146. Upon locating the active SMI source 144, the SMI dispatcher 140 calls for the appropriate SMI handler 146 to resolve the SMI. The SMI handler 146, shown in FIG. 2, represents the particular SMI handler that is capable of handling the SMI generated by a particular active SMI source 144.

In addition, the exemplary embodiment shown in FIG. 2 may include modules that act as counters. Specifically, the SMI dispatcher 140 may utilize a global counter 148 and an individual component counter 150. The global counter 148 is used to track the total number of SMIs generated within IHS 100. The individual component counter 150 is used to track the number of SMIs generated by a particular SMI source 144. Therefore, in one embodiment of the exemplary process there would be one global counter 148 and as many individual component counters 150 as there are possible SMI sources 144.

The exemplary embodiment of the process departs from the traditional fixed list technique of checking for the source of an SMI. Instead, the exemplary process reorders the SMI source list 142 so that the SMI sources that generated SMIs most frequently are promoted to the top of the SMI source list. In this manner, the SMI dispatcher 140 is able to check these most likely SMI sources first. By dynamically adjusting the order in which the possible SMI sources 144 are checked, the amount of time required to identify an active SMI source can be reduced or minimized. Therefore, the exemplary process results in optimizing the speed of SMI handling and reducing the amount of time the IHS 100 is in system management mode.

Figure 3:
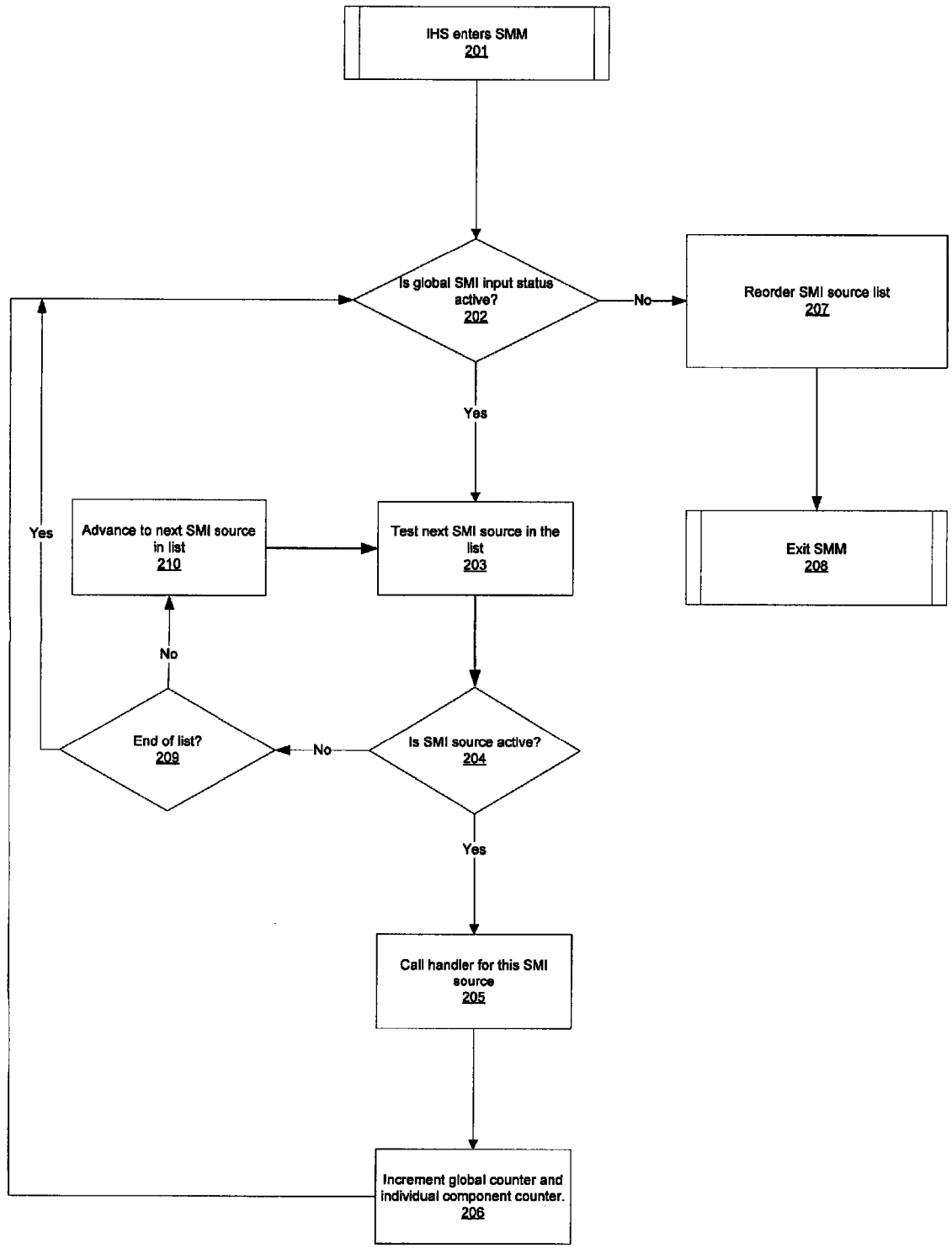
FIG. 3 is a flow diagram of an exemplary embodiment of a method to dynamically order system management interrupt handler dispatches.

FIG. 3 is a flow diagram of an exemplary embodiment of a method to dynamically order system management interrupt handler dispatches. The process begins in step 201, when an SMI is generated by a hardware or software component of the IHS 100. The presence of the SMI causes the IHS 100 to enter system management mode.

Once in system management mode, at step 202, the SMI dispatcher 140 is invoked to determine whether the global SMI input status is active. The global SMI input status is active if an SMI source is active within the IHS 100. An active SMI source 144, for example, may include a hardware or software component that generated an SMI that has not been handled by the appropriate SMI Handler 146. If the global input status is active, then at step 203 the SMI dispatcher 140 begins the process of identifying the active SMI source. As will be discussed in more detail below, the SMI dispatcher 140 goes through the SMI source list 142 which is a dynamic list of possible sources capable of generating a SMI.

Specifically, in step 203 the SMI dispatcher 140 checks the first possible SMI source in the SMI source list 142. At step 204, the SMI dispatcher 140 determines whether the first possible source on the SMI source list 142 is active. If the first source on SMI source list 142 caused the SMI and thereby is active, then the process continues onto step 205. If on the other hand, the first possible source is not active then the SMI dispatcher 140 checks the next SMI source in the SMI source list 142 assuming the end of the list has not been reached (steps 209 and 210).

The process of identifying the active SMI source is repeated (i.e. steps 203, 204, 209 and 210) until an active source is identified by the SMI dispatcher 140 or the end of the SMI source list 142 is reached.

In step 204, assuming that the current SMI source being checked is the active SMI source, then the process proceeds to step 205. In step 205, the SMI dispatcher 140 calls the SMI handler 146 for that particular source to handle the SMI.

After the SMI handler 146 resolves the SMI, the process proceeds to step 206 where the global counter 148 is incremented by one. Thus, for every SMI that occurs within IHS 100 the global counter 148 is increased by one count. In addition, the individual component counter 150 for the particular component that caused the SMI is also increased by one count. Specific to step 206, the SMI dispatcher 140 alerts the BIOS 135 to increment both the global counter 148 and the individual component counter 150 of the particular SMI source 144 that caused the SMI to increase their respective count by one.

After increasing the global counter 148 and the respective individual component counter 150, the process returns to step 202. Again, at step 202 the SMI dispatcher 140 is invoked to determine whether the global SMI input status is still active within the IHS 100. If the SMI dispatcher 140 determines the global SMI input status is active then the process proceeds to step 203 and follow the subsequent steps to identify and handle the SMI.

If at any point going down the SMI source list it is determined at step 209 that the end of the dynamic list is reached and an active SMI source is not identified, the process returns to step 202. Again at step 202, the SMI dispatcher 140 determines whether the IHS 100 actually received an SMI by checking whether the global SMI input status is active. If the SMI dispatcher 140 determines the global SMI input status is active then the exemplary process returns to step 203 and follows the subsequent steps dictated in FIG. 3 (i.e. steps 204, 209 and 210). If on the other hand, the SMI dispatcher 140 determines the global SMI input status is not active then the process continues to step 207. At step 207 the SMI source list 142 is reordered such that the sources that are generating the most SMIs are moved to the top of the list so that those sources will be checked first the next time an SMI is generated by a SMI source 144 of the IHS 100.

After reordering SMI source list 142, the IHS 100 at step 208 exits system management mode and returns to conventional operations (e.g., an operation being performed by the IHS 100 before the SM is generated).

As previously mentioned, at step 207 the SMI source list 142 may be reordered such that those SMI sources 144 generating the most SMIs are moved to the top of the list. The SMI dispatcher thus checks these SMI sources first the next time an SMI is generated. In step 207, as an example, the process of reordering the SMI source list 142 may be based on comparing the individual component counters 150 relative to one another. In other words, the SMI source list may be reorganized according to a decreasing order in the current values of the associated individual component counters. Alternatively, the count of each respective individual component counter may be compared to a threshold. Those SMI sources having an associated count greater than and equal to the threshold are promoted to the top of the list and ahead of the SMI sources that have associated count values less than the threshold.

It should be noted that step 207 does not have to be performed after each SMI is handled within the exemplary process. One skilled in the art will recognize that by using the global counter 148 one may reorder the SMI source list 142 only when the global counter 148 reaches a certain threshold value. In other words, the SMI source list 142 would be reordered only when the global counter 148 reaches the threshold value. After the global counter reaches the threshold value the count values of the individual component counters 150 are compared against one another and the SMI source list is reorganized according to this comparison. Furthermore in this example, the individual component counters 150 and the global counter 148 are reset to zero after the reordering of SMI source list 142 is completed. This approach would allow a larger sample of SMIs to be considered before the SMI source list 142 is reordered at step 207. Furthermore, this approach may reduce the number of times or the frequency that the SMI source list 142 is reordered, and thereby gaining some efficiency in the process.

Yet in a further embodiment, the reordering of the SMI source list 142 may be based on a running average of the SMIs that occur within IHS 100. In such an embodiment, the SMI source list 142 is reordered when the global counter 148 reaches the threshold value. When the global counter 148 reaches the threshold value, the count values of the individual components counters 150 are first averaged with their historical count. The historical count represents the total number of SMIs that have occurred for each SMI source 144 prior to the last time the individual component counters 150 were reset to zero. By averaging the individual component counters 150 with their respective historical count, the resultant average represents a running average for each individual component counter 150. The running averages for the individual component counters 150 are then compared to determine which SMI sources 144 are generating the most SMIs. Subsequently, the SMI source list 142 is reordered based on those SMI sources 144 generating the most SMIs based on their respective running average. After the reordering of SMI source list 142 is complete, the respective count within each individual component counter 150 is added to the appropriate historical count being kept for each SMI source 144 in order to maintain the proper historical count. Additionally, the individual component counters 150 and the global counter 148 are reset to zero after the reordering of the SMI source list 142 is completed. By resetting the global counter 148 and individual component counters 150 as well as maintaining the proper historical count, this exemplary process of reordering SMI source list 142 after a certain threshold value is reached can be performed again when the next threshold value is reached. The use of a running average reduces the likelihood, over time, of the order of the SMI source list 142 being adjusted while still optimizing the amount of time it takes within the exemplary process to identify the SMI source 144 that generated a SMI.

For further exemplary purposes, the SMI source list 142 may be reordered using many different techniques including, but not limited to, placing the SMI source 144 causing: (i) the most interrupts over a time period atop the list, (ii) the most interrupts based on a rolling average across all interrupts occurring within the IHS atop the list, or (iii) the most interrupts based on a measurement taken on an hourly, daily, weekly, or monthly basis atop the list.

The examples described above with respect to the process of reordering the SMI source list 142 during step 207 are for exemplary purposes and are not to be construed as limitations. In addition, the threshold value referred to with respect to step 207 can vary. For example, the threshold value set for the global counter 148 can be based on any desired number of SMIs that have to occur before performing step 207. Therefore, the threshold value discussed above is for exemplary purposes and is not to be construed as a limitation.

After the reordering of the SMI source list 142 is completed at step 207, the process continues to step 208. At step 208, the exemplary process causes the IHS 100 to exit system management mode and return to conventional operations (e.g., an operation being performed by the IHS 100 before the SMI is generated).

Applying the process flow described in FIG. 3, consider an example in which there are three possible SMI sources 144: (i) software, (ii) periodic timer, and (iii) over-temperature. Assume over time that each of these SMI sources 144 have generated several SMIs within IHS 100 such that the respective individual component counter values for the software has reached 23, the periodic timer has reached 52, and the over-temperature has reached 24. In addition, assume the global counter 148 for this example has a count of 99 with a threshold value set at 100. Furthermore, assume that the SMI source list 142 directs the SMI dispatcher 140 to check the software first, followed by the periodic timer, and then the over-temperature to identify the source of an SMI. Finally, assume that the process at step 207 does not reorder the SMI source list 142 until the global counter's value reaches 100 and there is no historical count to consider.

Applying the above assumptions the exemplary process begins at step 201, when the periodic timer generates an SMI.

The presence of the SMI causes the IHS 100 to enter system management mode. Once in system management mode, at step 202, the SMI dispatcher 140 is invoked to determine whether the global SMI input status is active. The global SMI input status is active in this example because the periodic timer has generated an SMI. Therefore, the process proceeds to step 203.

At step 203 in this example, the SMI dispatcher 140 locates the first possible SMI source based on what is listed first within the SMI source list 142. In this example, the software is listed first and thereby at step 204, the SMI dispatcher 140 determines whether the software generated the SMI. Because the software did not generate the SMI, the process at step 209 dictates the SMI dispatcher 140 to advance to the next source on the SMI source list 142 which is the periodic timer. Once the SMI dispatcher 140 locates the periodic timer the process returns to step 203.

Returning to step 203 the SMI dispatcher 140 tests the periodic timer to determine whether it is active. At step 204 because the periodic timer generated the SMI, the SMI dispatcher 140 would discover the periodic timer is active. The SMI dispatcher 140 would then call the SMI handler 146 for the periodic timer at step 205 to handle the SMI generated by the periodic timer. When the SMI handler 146 completes its handling of the SMI generated by the periodic timer the process moves to step 206.

Specifically, during step 206 the SMI dispatcher 140 alerts the BIOS 135 to increment the global counter 148 by one count, so that the total count within the global counter 148 is 100. Furthermore, the SMI dispatcher 140 alerts the BIOS 135 to increase the count by one for the individual component counter for the periodic timer, so that the total count for this counter becomes 53.

After increasing the global counter 148 and the respective individual component counter 150 for the periodic timer, the process returns to step 202. Again, at step 202 the SMI dispatcher 140 determines whether the global SMI input status is active within the IHS 100. Because the SMI generated by the periodic timer has been handled and there were no other SMIs generated within our example, the SMI dispatcher 140 would determine the global SMI input status is not active. Thus, the process continues to step 207.

At step 207, the process would determine whether any reordering of the SMI source list 142 should occur. As previously stated, the threshold value for the global counter 148 was set at 100. Here, the global counter count is increased to 100 because of the SMI generated by the periodic timer thereby causing the threshold value to be reached. Thus, the SMI source list 142 is reordered so that those SMI sources 144 generating SMIs most often are placed at the beginning of the SMI source list 142.

The reordering of the SMI source list 142 would begin with the respective count values for the individual component counters for the software, the periodic timer, and the over temperature being compared against one another. Because the counts of the individual component counters are software 23, periodic timer 53, and over temperature 24, the SMI source list 142 would be reordered by placing the periodic timer first on the list followed by the over-temperature and software SMI sources.

After the reordering of the SMI source list 142, the individual component counters 150 and the global counter 148 are reset to zero before the process proceeds to step 208. In step 208 the IHS 100 exits system management mode and returns to conventional operations (e.g., an operation being performed by the IHS 100 before the SMI is generated).

It should be noted, that the exemplary process increases the effectiveness and efficiency of the IHS 100 with respect to handling a SMI. Specifically, because the process allows for the SMI source list 142 to be dynamically adjusted so that those sources that are generating the most SMIs are placed atop the list increases the likelihood that the SMI dispatcher would be able to identify the active SMI source without traversing most of the SMI source list. The SMI dispatcher 140 is much more likely to find the HIS component that caused the current SMI, based on a past history of SMI occurrences.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of handling interrupts within an information handling system (IHS), the method comprising:
    entering into an interrupt management mode in response to receiving an interrupt;
    identifying at least one source of the received interrupt in accordance with an ordered list of a plurality of possible interrupt sources, wherein the ordered list provides a scanning order for checking the possible interrupt sources;
    dispatching an appropriate interrupt handler to resolve the identified at least one source of the received interrupt;
    noting a frequency of occurrence of each identified at least one source generating a received interrupt over time; and
    reordering the ordered list of possible interrupt sources in response to the noted frequency, wherein the possible interrupt sources with higher frequencies are placed in the beginning of the ordered list.

2. The method of claim 1, wherein identifying the at least one source of the received interrupt comprises checking each possible interrupt source in the ordered list starting at the beginning of the list.

3. The method of claim 1, wherein identifying the at least one source of the received interrupt comprises checking each software and hardware interrupt source in the ordered list.

4. The method of claim 1, wherein reordering the ordered list of possible interrupt sources comprises placing the identified at least one source of the received interrupt at the beginning of the list.

5. The method of claim 1, wherein reordering the ordered list of possible interrupt sources comprises tracking the number of interrupts generated by each possible interrupt source in the ordered list, and reordering the ordered list in response to a comparison of the number of interrupts generated by each possible interrupt source.

6. The method of claim 1, wherein reordering the ordered list of possible interrupt sources comprises maintaining a count value of the number of interrupts generated by each possible interrupt source in the ordered list, and reordering the ordered list in response to a comparison of the count values.

7. The method of claim 1, wherein reordering the ordered list of possible interrupt sources comprises:
    tracking the number of total interrupts occurring in the IHS;
    tracking the number of interrupts generated by each possible interrupt source in the ordered list; and reordering the ordered list of possible interrupt sources in response to the number of interrupts generated by each possible interrupt source at a time when the number of total interrupts occurring in the IHS reaches a predetermined threshold.

8. The method of claim 1, wherein reordering the ordered list of possible interrupt sources comprises maintaining a historical running average of the number of occurrences of each identified source of interrupt over time, and reordering the ordered list in response to a comparison of the historical running averages.

9. A system of handling interrupts, the system comprising:
a dispatcher operable to receive at least one interrupt from a plurality of interrupt sources;
a list specifying an order of checking the plurality of interrupt sources, the dispatcher operable to identify a source of the received at least one interrupt by checking each of the plurality of interrupt sources in accordance to the order specified in the list; and
a counter associated with each of the plurality of interrupt sources in the ordered list, each counter maintaining a number of occurrence of interrupt generated by the associated interrupt source, wherein the list of interrupt sources is reordered in accordance to a comparison of the number of occurrences of interrupts maintained in the counters.

10. The system of claim 9, further comprising:
a global counter maintaining a total number of occurrence of interrupts, wherein the list of interrupt sources is reordered when the global counter value reaches a predetermined threshold.

11. The system of claim 9, wherein the plurality of interrupt sources comprise hardware and software components.

12. The system of claim 9, wherein the plurality of interrupt sources are associated with an information handling system (IHS), and the IHS is selected from a group consisting at least one of a personal computer, a personal digital assistant, a cell phone, a consumer electronic device, a network server or storage device, a switch, router or other network communication device, and any other suitable device.

13. The system of claim 9, wherein the plurality of interrupt sources comprise components of the IHS selected from a group consisting of network controllers, input devices, display devices, memory devices, and storage devices.

14. The system of claim 9, further comprising at least one interrupt handler operable to resolve the received at least one interrupt generated by the identified interrupt source.

15. A computer-readable medium having encoded thereon, a method comprising:
entering into an interrupt management mode in response to receiving an interrupt;
identifying at least one source of the received interrupt in accordance with an ordered list of a plurality of possible interrupt sources, wherein the ordered list provides a scanning order for checking the possible interrupt sources;
dispatching an appropriate interrupt handler to resolve the identified at least one source of the received interrupt;
noting a frequency of occurrence of each identified at least one source generating a received interrupt over time; and
reordering the ordered list of possible interrupt sources in response to the noted frequency, wherein the possible interrupt sources with higher frequencies are placed in the beginning of the ordered list.

16. The method of claim 15, wherein identifying the at least one source of the received interrupt comprises checking each possible interrupt source in the ordered list starting at the beginning of the list.

17. The method of claim 15, wherein identifying the at least one source of the received interrupt comprises checking each software and hardware interrupt source in the ordered list.

18. The method of claim 15, wherein reordering the ordered list of possible interrupt sources comprises placing the identified at least one source of the received interrupt at the beginning of the list.

19. The method of claim 15, wherein reordering the ordered list of possible interrupt sources comprises tracking the number of interrupts generated by each possible interrupt source in the ordered list, and reordering the ordered list in response to a comparison of the number of interrupts generated by each possible interrupt source.

20. The method of claim 15, wherein reordering the ordered list of possible interrupt sources comprises maintaining a count value of the number of interrupts generated by each possible interrupt source in the ordered list, and reordering the ordered list in response to a comparison of the count values.

21. The method of claim 15, wherein reordering the ordered list of possible interrupt sources comprises:
tracking the number of total interrupts occurring in the information handling system (IHS);
tracking the number of interrupts generated by each possible interrupt source in the ordered list; and
reordering the ordered list of possible interrupt sources in response to the number of interrupts generated by each possible interrupt source at a time when the number of total interrupts occurring in the IHS reaches a predetermined threshold.

22. The method of claim 15, wherein reordering the ordered list of possible interrupt sources comprises maintaining a historical running average of the number of occurrences of each identified source of interrupt over time, and reordering the ordered list in response to a comparison of the historical running averages.

23. A system of handling interrupts, the system comprising:
means for entering into an interrupt management mode in response to receiving an interrupt;
means for identifying at least one source of the received interrupt in accordance with an ordered list of a plurality of possible interrupt sources, wherein the ordered list provides a scanning order for checking the possible interrupt sources;
means for dispatching an appropriate interrupt handler to resolve the identified at least one source of the received interrupt;
means for noting a frequency of occurrence of each identified at least one source generating a received interrupt over time; and
means for reordering the ordered list of possible interrupt sources in response to the noted frequency, wherein the possible interrupt sources with higher frequencies are placed in the beginning of the ordered list.

* * * * *